United States Patent [19]
Wildey

[11] Patent Number: 5,579,674
[45] Date of Patent: Dec. 3, 1996

[54] SAW TOOTH ATTACK FACE AND EDGE STRUCTURE

[75] Inventor: Allan J. Wildey, Paris, Canada

[73] Assignee: FMG Timberjack, Inc., Woodstock, Canada

[21] Appl. No.: 219,149

[22] Filed: Mar. 29, 1994

[51] Int. Cl.$^6$ .................................................. B27B 33/08
[52] U.S. Cl. ........................... 83/835; 83/853; 83/854
[58] Field of Search ............................. 83/835, 840, 841, 83/842, 843, 853, 854, 855; 144/241; 407/42, 116

[56] References Cited

U.S. PATENT DOCUMENTS

| | | | |
|---|---|---|---|
| 1,037,146 | 8/1912 | Hunter | 83/836 |
| 3,818,561 | 6/1974 | Montana et al. | 83/836 X |
| 4,932,447 | 6/1990 | Morin | 144/34 R |
| 5,131,305 | 7/1992 | MacLennan | 83/840 |
| 5,203,649 | 4/1993 | Katbi et al. | 407/116 X |
| 5,205,199 | 4/1993 | MacLennan | 83/839 |
| 5,207,538 | 5/1993 | Satran | 407/116 X |
| 5,207,748 | 5/1993 | Katbi et al. | 407/116 X |
| 5,261,306 | 11/1993 | Morey et al. | 83/855 X |

OTHER PUBLICATIONS

Applicant'Exhibit 1–a Polaroid of saw tooth (undated).
Applicant's Exhibit 2–a Polaroid of saw tooth (undated).
Drawing containing Figs. P1–P5 of saw tooth admitted prior art. (undated).

*Primary Examiner*—Rinaldi I. Rada
*Attorney, Agent, or Firm*—Quarles & Brady

[57] ABSTRACT

A square saw tooth having four cutting edges of the type which is rotatable about its axis on a saw disc to present a fresh cutting edge when the radially outermost edge wears out has carbide wear plates covering the high wear areas of its attack face and providing its cutting edges. A wear plate is provided at each corner of the attack face, and each wear plate has a flat rear surface for attachment to the tooth body and a front surface of a complex shape, having plateau surface areas at the corners, where the plates are thicker, and curved surfaces which recede from the plateau areas toward the interior of the attack face, so that the plate recedes in thickness away from the plateau area. This construction helps provide more uniform wear over the surfaces and edges of the attack face for a more efficient consumption of the wear plates.

10 Claims, 1 Drawing Sheet

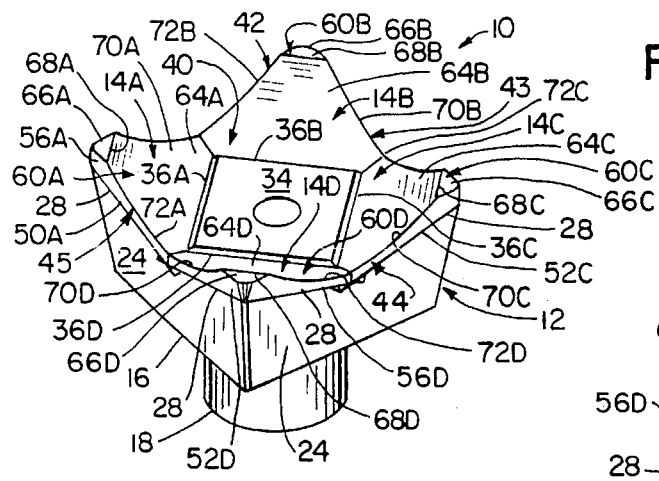

SAW TOOTH ATTACK FACE AND EDGE STRUCTURE

BACKGROUND OF THE INVENTION

1. Field of the Invention

This invention relates to the shape and configuration of the attack face and cutting edge structures of a saw tooth, and particularly to such structures applied to a four-sided rotatable saw tooth for a wood cutting saw.

2. Discussion of the Prior Art

Four-sided rotatable teeth for circular tree cutting saw blades in which one edge of the tooth is positioned radially outermost from the rotary axis of the blade to cut a kerf in a standing tree are known from U.S. Pat. No. 4,932,447. This type of tooth has a four-sided head with an attack face at one end, each side being coterminous with the attack face along a cutting edge. The tooth is oriented on the blade with one of the sides on the outside of the blade so that the one side and its cutting edge are substantially vertical in the cutting position of the blade, as the blade is advanced through a tree. The outside cutting edge forms the kerf by chiseling off the working (vertical) surface of the kerf, and chips from the cutting operation flow along the attack face of the tooth for evacuation from the kerf. When the outside edge becomes dull, the tooth is rotated 90° or 180° about its longitudinal axis and resecured to present one of its other three edges in the outermost position for cutting. When all four edges have become dull, the tooth is replaced or reconditioned.

In this orientation of the tooth on the blade, two of the sides of the tooth are in a substantially horizontal plane, one of the horizontal sides being on the top side of the tooth and the other horizontal side being on the bottom side of the tooth. The top side of the tooth is in close proximity or contact with the top side of the kerf (on the tree trunk) and the bottom side of the tooth is in close proximity or contact with the lower side of the kerf (on the top of the stump). This close proximity or contact results in a certain amount of wear along the top side edge and bottom side edge of the tooth during a cutting operation, although most wear occurs at the outermost side of the tooth which actually cuts the kerf.

Adjacent sides and the attack face of saw teeth meet at the corner tips of the attack face. Because the mass of material of the tooth diminishes toward a corner tip and because abrasion occurs along both of the cutting edges which define a corner tip between the outermost edge and the top and bottom edges, wear is most concentrated at the corner tips of the tooth. Wear of the corner tips is especially exacerbated under sandy conditions of cutting as occurs frequently in the southeastern part of the United States where sand on the forest floor can get into the bark of the trees, e.g. from wind or rain, and abrade teeth severely or where trees are severed at ground level. In addition, because the corner tips are at the extremities of the leading or attack face of the tooth, they are especially susceptible to damage from impact, for example, from hitting a rock or another piece of equipment.

It has been known to retard wear in all types of saw teeth under these conditions by providing one or more tungsten carbide plates to cover the high wear areas of the attack face. However, this is only a partial solution to the problem, as the corners still wear more quickly than the inner edges of the attack face, even when the corners and the inner edges are carbide. In addition, the carbide plates in prior teeth have typically had sharp points or tips, which wore or broke off relatively easily.

SUMMARY OF THE INVENTION

The invention provides a saw tooth of the type having multiple lateral sides and an attack face at one end. The intersection of the attack face with each side forms a cutting edge along the edge of the side and the intersections of the attack face with each pair of adjacent sides forms a corner. An improvement of the invention is that a plateau is formed on the attack face at each corner, and the cutting edges adjacent to each plateau recede from the plateau. This results in more tooth material adjacent to the corner tip, where abrasion and the possibility of impact damage is especially high, to result in more even wear over the length of each cutting edge and over the associated areas of the attack face.

In a preferred aspect, the plateaus are in approximately the same plane, which is orthogonal to the longitudinal axis of the tooth. This maximizes the volume of tooth material adjacent to the corner tip. It also provides the possibility to sharpen the cutting edges of the tips by grinding down the plateaus simultaneously on a surface grinder.

In another useful aspect, the receding edges are curved to provide efficient chip flow across them and evacuation of chips from the kerf.

In a form which is especially useful for highly abrasive cutting conditions, the tooth comprises a body and wear plates secured to the body, surfaces of the wear plates defining the attack face and edges of the plates defining the cutting edges. The wear plates are thickest at the plateaus so as to provide more even wear across the entire plate, for the most efficient use and consumption of the plates. Preferably, the rear surface of the plates is flat, so that the rear surface can be formed easily and so that the mating surfaces of the body can be easily machined to match the rear surface of the plates.

In another useful aspect, a surface of the attack face which is coterminous with a plateau is defined by a surface of a cylinder, the axis of the cylinder being perpendicular to a plane which includes the axis of the tooth and runs through a corner tip of the plateau. A surface so formed provides both of its adjacent cutting edges with a curvature and provides the adjoining surfaces with a curvature that channels chips out of the kerf, while still allowing making all of the wear plates identical and without complex molding, sintering or machining operations.

In another useful aspect, the cutting edges of each plateau meet in a radius at the corner tip of the tooth. This truncates the otherwise sharp and fragile extreme tip which would be created by the intersection of the edges to further reinforce the tooth corner.

Other objects and advantages of the invention will be apparent from the detailed description and the drawings.

BRIEF DESCRIPTION OF THE DRAWINGS

FIG. 1 is a perspective view of a saw tooth incorporating the invention;

FIG. 2 is a side plan view of the saw tooth of FIG. 1;

FIG. 3 is a plan view of the attack face of the saw tooth of FIG. 1; and

FIG. 4 is a sectional view of the tooth taken along the plane of the line 4—4 of FIG. 3.

DETAILED DESCRIPTION OF THE PREFERRED EMBODIMENTS

FIGS. 1–4 illustrate a saw tooth 10 of the invention which includes a body 12 and four wear plates 14A–D. The body 12 is of conventional and known configuration. The body 12 is typically made of steel and has a head portion 16 and a shank portion 18 which in the case of the body 12 is integral with the head 16. A blind bore 20 extends axially through the body 12 and the shank end of the bore 20 is threaded at 22 so as to be engaged by an axial bolt to secure the tooth 10 on the periphery of a circular saw blade disc with one of its four cutting edges radially outermost from the rotary axis of the saw blade. The radially innermost side of the tooth typically abuts a surface of the blade to prevent the tooth from rotating during a cutting operation. Mounting four-sided rotatable saw teeth in this manner is well known and forms no part of the present invention.

The head 16 has four lateral sides 24, each of which is flat. The head 16 itself is pyramidal, tapering in the direction toward the shank 18. Each side 24 at its end opposite from the shank 18 is coterminous with a support surface 26 along edges 28 which generally define a shallow V. The support surface 26 of the head 16 is defined by milling flat each corner of the support surface 26 at an angle as best shown in FIG. 4. The rotary axis of the milling cutter used in this machining operation could be parallel to the surface being milled and lie in a plane defined by: (1) the longitudinal axis 27 of the tooth; and (2) a line running from the tip of the corner being milled to the tip of the diagonally opposite corner. As such, when the mill is run across the corner of the surface 26 and nears the edge of the surface 26, it cuts an undercut 30 or 31 in the support surface 26. The undercut 30 shown in FIG. 2 would be cut when milling the right corner area of surface 26 (as viewed in FIG. 2) and the undercut 31 would be cut when milling the left corner area of surface 26. These undercuts 30, 31 are a result of the milling process and perform no useful function.

After all four corner areas of the surface 26 are milled, a central square 34 of material remains in the center of the surface 26 with sides which are perpendicular to their adjacent corner areas of the surface 26. These sides are designated 36A–D in the drawings.

As stated above, the body 12 is known and is prior art. The body 12 may be identical to the bodies used in the Koehring Waterous Series 4000 Carbide Tipped Teeth, which are commercially available from the Koehring Waterous Division of FMG Timberjack Inc. of Woodstock, Ontario, Canada.

The saw tooth 10 differs from prior art saw teeth by the shape of its attack face 40 and cutting edges 42–45, which shapes are largely defined by the wear plates 14A–D. Each of the wear plates 14A–D are identical to one another and each has a rear surface 50A–D to match the corresponding corner area of the support surface 26. Each rear surface 50A–D is brazed, soldered or otherwise suitably secured to the corresponding corner area to mount each wear plate 14A–D at its corresponding corner of the body 12.

Each plate 14A–D has five lateral sides 52–56 as best shown in FIGS. 1 and 3. For each of the reference numbers 52–56, an alphabetic suffix has been added in the drawings to correspond to the alphabetic suffix of the corresponding wear plate 14A–D. For example, sides 52A–56A designate the sides of wear plate 14A.

Opposite from each rear surface 50A–D, each wear plate 14A–D has a corresponding attack face 60 A–D. The four attack faces 60A–D and the exposed surface of square 34 define the attack face 40 of the tooth 10.

The following description applies to any one of the plates 14A–D, therefore the A–D suffix is not applied to reference numerals 14, 50, 52, 53, 54, 55, 56, 60, 64, 66, 68, etc. in this description, unless necessary to distinguish one plate 14A–D from another.

Each attack face 60 is defined by a curved surface 64 and a flat plateau surface 66. Each curved surface 64 is defined by a section of a cylinder which has its axis parallel to rear surface 50 and in a plane which is: (1) perpendicular to the rear surface 50; and (2) through the outer points on the surface 64 where the surface 64 meets its adjacent surfaces 64 (in other words, through the midpoints of the edges 42–45 of the tooth which define the corner; for example in the case of plate 14A, these points have been labelled x and y in FIG. 3). In the preferred embodiment, the radius of this cylindrical section is approximately 2 inches for a tooth which is approximately 1-⅞" tip to tip along a side. The surface 64 is flat and parallel to rear surface 50 in its area from a line through these points (x and y in the case of plate 14A) to the edge where surface 64 intersects surface 54. When the plates 14 are mounted on body 12, each surface 64 is substantially flush with the square 34 at this edge.

The curved portion of surface 64 of each plate 14 extends up to edge 68 where the surface 64 is coterminous with the plateau 66. Each plateau 66 is flat, in a plane generally perpendicular to the axis of the tooth 10, and extends from the edge 68 to cutting edges defined by the cotermination of each plateau 66 with the corresponding sides 52 and 56 of the corresponding plate 14.

The cutting edge along the side 52 of each wear plate 14 is defined by the intersection of the side surface 52 with the curved surface 64 and with the plateau 66. This cutting edge is designated 70 in the drawings. The cutting edge defined by the intersection of side surface 56 with curved surface 64 and plateau 66 is designated 72. The cutting edges 70 and 72 (and the sides 52 and 56) meet at each corner tip of the tooth with a small radius R (see "R" at the tip of plate 14A in FIG. 3), so as to truncate the sharp tip which would otherwise be formed, thereby reinforcing the tip.

Each of the four cutting edges 42–45 of the saw tooth 10 is made up by one cutting edge 70 and one cutting edge 72 of adjacent wear plates 14. Thus, tooth edge 42 is defined by plate edges 70A and 72B, tooth edge 43 is defined by plate edges 70B and 72C, tooth edge 44 is defined by plate edges 70C and 72D, and tooth edge 45 is defined by plate edges 70D and 72A. The edges 70 and 72 which make up each tooth cutting edge 42–45 meet in approximately the middle of the corresponding side 24, where the sides 53 and 55 of adjacent plates 14 meet (for edge 42, see point x in FIG. 3; for edge 45, see point y in FIG. 3).

Thus, the attack face 40 of the tooth 10 has a complex shape, being defined by the four plateaus 66, the four curved surfaces 64 and by the exposed surfaces of the central square 34. Each of the four cutting edges of the saw tooth 10 also has a complex shape, being defined at its ends by straight lines which lay in a plane perpendicular to the axis of the tooth and from the straight lines toward the center of the adjacent side being defined by curved lines which meet in the center of the adjacent side.

The profile of each plate 14 results in increased thickness at the corner tips, in the areas of the plateau 66, and reduced thickness at the interior of each plate 14, in particular where each wear plate 14 meets the next adjacent wear plate 14. Thus, although the corners of the attack face 40 wear faster than the inner edges of the attack face 40, additional material is provided there so that the various areas of the plates 14 wear out at approximately the same time.

A saw tooth of the invention provides this advantage in a tooth which is readily manufacturable and which provides for smooth chip flow over the attack face 40. The width of each plateau 66 in the radial direction of a blade to which it is attached preferably exceeds a normal feed rate of the blade as it is advanced through a tree (for example, the plateau 66 may typically be 0.15 inches as measured along a line through axis 27 from edge 68 to the extreme tip of the plateau 66). The attack face 40, which is concave inward of the plateaus 66, is made curved in the concave area adjacent to the plateaus 66 by surfaces 64, which helps to smoothly direct the flow of chips away from the work surface of the kerf.

In addition, the increased wear plate thickness in the plateau areas and that the plateaus are all in the same plane allows sharpening the cutting edges of the plateaus simultaneously on a surface grinder. Since much of the cutting of a kerf is performed by these edges, a more efficient cut can be provided over the life of the plates by sharpening these edges.

Preferably, the wear plates 14 overhang the sides 24 of the head 16 by a small distance, for example 0.015 inches, to protect the sides 24 from wear and prevent them from "washing out" at their edges 28 directly beneath the plates 14. Thus, when the wear plates 14 become worn to the point of replacement, they can be removed from the body 12 and new wear plates affixed to the body 12 so as to recondition and reuse the body 12. Also, the rear edge of each side 54 is preferably chamfered as shown in FIG. 4 so that the top edge of surface 54 is close to the adjacent surface 36 so as to smoothly direct the flow of chips over the square 34.

A preferred embodiment of the invention has been described in considerable detail. Many modifications and variations to the preferred embodiment will be apparent to those skilled in the art. For example, the plateaus need not necessarily be flat or all lie in the same plane or be orthogonal to the axis of the tooth. Therefore, the invention should not be limited to the embodiment described, but should be defined by the claims which follow.

We claim:

1. A woodcutting saw tooth of the type having multiple lateral sides equally spaced from an axis of said tooth and an attack face at one axial end of said tooth, the intersections of said attack face with said sides forming cutting edges, wherein the intersections of said attack face with any two adjacent sides forms a corner, the improvement wherein a flat plateau is formed on said attack face at each corner, each plateau having a flat surface and having edges where said plateau intersects adjacent sides, said edges of said plateaus forming end sections of said cutting edges, said end sections of each cutting edge defining between them an inner section of said cutting edge, each inner section extending axially rearwardly from adjacent end sections, and a corner being formed at each location along each cutting edge where an end section of said cutting edge intersects an inner section of said cutting edge, wherein said flat surfaces are coplanar.

2. The improvement of claim 1, wherein said inner section of each cutting edge is curved adjacent to said end sections of said cutting edge.

3. The improvement of claim 1, wherein said tooth comprises a body and wear plates secured to said body, surfaces of said wear plates defining said attack face and edges of said plates defining said cutting edges.

4. The improvement of claim 3, wherein said wear plates are thickest at said plateaus.

5. The improvement of claim 1, wherein the end sections defined by each said plateau are joined by a radius at a corner tip of said plateau.

6. The improvement of claim 1, wherein said tooth is four sided and includes a separate wear plate at each corner of the attack face, adjacent ones of said plates meeting approximately midway between said corner tips along each side of the tooth, and wherein the wear plates are thicker at the corner tips than they are where they meet.

7. The improvement of claim 1, wherein said plateau flat surfaces lie in a plane which is perpendicular to an axis of the tooth.

8. A saw tooth as in claim 1, wherein said end sections are straight.

9. A woodcutting saw tooth of the type having multiple lateral sides equally Spaced from an axis of sail tooth and an attack face at one axial end of said tooth, the intersections of said attack face with said sides forming cutting edqes, wherein the intersections of said attack face with any two adjacent sides forms a corner, the improvement wherein a flat plateau is formed on said attack face at each corner, each plateau having edges where said plateau intersects adjacent sides, said edges of said plateaus forming end sections of said cutting edges, said end sections of each cutting edge defining between them an inner section of said cutting edge, each inner section extending axially rearwardly from adjacent end sections, and a corner being formed at each location along each cutting edge where an end section of said cutting edge intersects an inner section of said cutting edge, wherein a surface of the attack face which is coterminous with a plateau forms a portion of a surface of a cylinder of constant radius which has an axis that is perpendicular to a diagonal plane, said plane being defined by the axis of the tooth and a corner tip of said plateau.

10. The improvement of claim 1, wherein surface areas of said attack face adjacent to said plateaus recede from said plateaus.

* * * * *

UNITED STATES PATENT AND TRADEMARK OFFICE
CERTIFICATE OF CORRECTION

Patent No.   : 5,579,674
Dated        : December 3, 1996
Inventor(s)  : Allan J. Wildey It is certified that error appears in the above-identified patent and that said Letters Patent is hereby corrected as shown below:

Col. 6, line 28 (claim 9) change "Spaced" to --spaced--.

Col. 6, line 28 (claim 9) change "sail" to --said--.

Col. 6, line 30 (claim 9) change "edqes" to --edges--.

Signed and Sealed this

Thirteenth Day of May, 1997

Attest:

BRUCE LEHMAN

*Attesting Officer*      *Commissioner of Patents and Trademarks*